No. 884,078. PATENTED APR. 7, 1908.
R. R. DEBACHER.
FRAME FOR MIRRORS, BRUSHES, AND THE LIKE.
APPLICATION FILED SEPT. 10, 1907.

Witnesses:
F. George Barry.
Otto W. Holmgren.

Inventor:
Robert R. Debacher
by attorneys

UNITED STATES PATENT OFFICE.

ROBERT R. DEBACHER, OF HOBOKEN, NEW JERSEY.

FRAME FOR MIRRORS, BRUSHES, AND THE LIKE.

No. 884,078.  Specification of Letters Patent.  Patented April 7, 1908.

Application filed September 10, 1907. Serial No. 392,100.

*To all whom it may concern:*

Be it known that I, ROBERT R. DEBACHER, a citizen of the United States, and resident of Hoboken, in the county of Hudson and State of New Jersey, have invented a new and useful Improvement in Frames for Mirrors, Brushes, and the Like, of which the following is a specification.

The object of this invention is to provide certain improvements in the construction of frames whereby an article such, for instance as a mirror or its back plate, one or both, may be held within the frame against displacement by a spacing mat located in the plane of the article, which mat has its inner edge fitted to the edge of the article and its outer edge fitted to the side walls of the frame, so that undue pressure on the edge of the article which would tend to break the same, is entirely eliminated.

Figure 1:
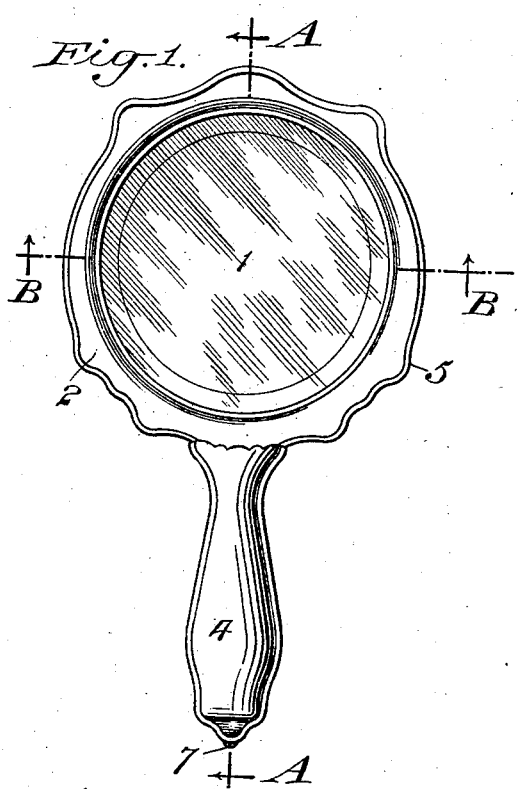
Figure 2:
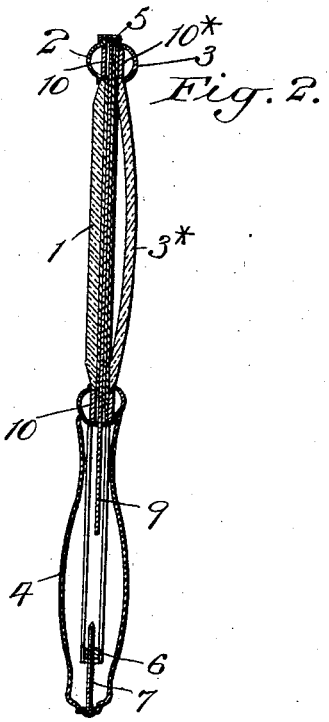
Figure 3:
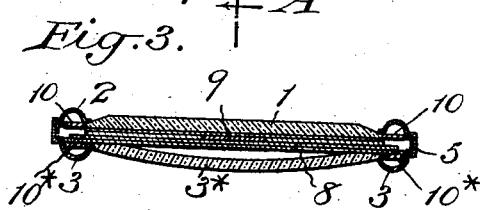
Figure 4:
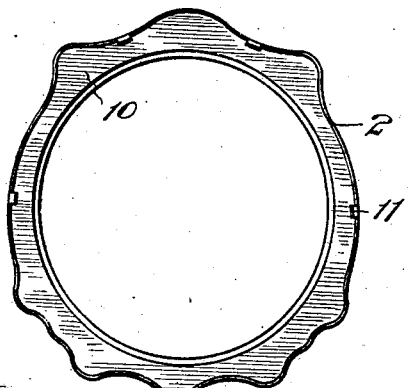
Figures 5, 6:
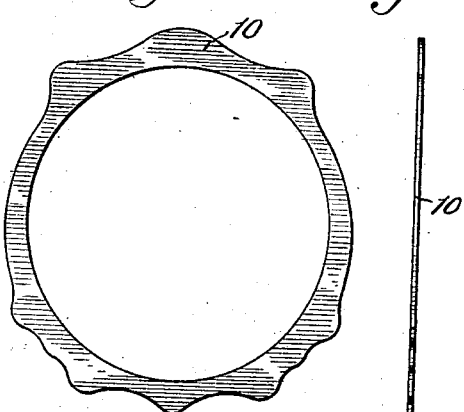

A practical embodiment of my invention is represented in the accompanying drawings in which Figure 1 represents a mirror and its frame in front elevation. Fig. 2 is a section taken in the plane of the line A—A of Fig. 1, looking in the direction of the arrows. Fig. 3 is a section taken in the plane of the line B—B of Fig. 1, looking in the direction of the arrows. Fig. 4 is a detail inside view of the front member of the frame with the spacing mat in position therein, the mirror being removed. Fig. 5 is a detail face view of the spacing mat, and Fig. 6 is an edge view of the same.

The article herein shown in connection with my invention is a mirror, denoted by 1. The hollow frame for the mirror comprises a front member 2, a back member 3, a back plate 3*, a handle 4 and an encircling band 5 arranged to embrace the outer edges of the front and back members. This encircling band has its ends extended down into the hollow handle 4 and is there provided with a nut 6 arranged to be engaged by a screw 7 carried by the handle. The side walls of the frame may be made of any desired shape to suit different requirements as to design and ornamentation.

The filling between the mirror and back plate of the frame is provided for by inserting a plurality of cards 8 between the back of the mirror and the said back plate. A strengthening strip 9 extends across the back of the mirror and into the hollow handle as is usual. The front member 2 of the frame has its inner edge overlapping the edge of the mirror for holding the mirror within the frame and the back member 3 has its inner edge overlapping the edge of the back plate 3* for holding it within the frame.

To prevent lateral displacement of the mirror within the frame, I provide a spacing mat 10 located in the plane of the mirror, which mat has its inner edge fitted to the edge of the mirror and its outer edge fitted to the side walls of the frame. This spacing mat is preferably held in position within the front member of the frame by cutting tongues 11 in the side walls of the front member of the frame and bending the same over the outer edge of the spacing mat.

To prevent lateral displacement of the back plate 3* within the frame, I provide a spacing mat 10* located in the plane of the back plate, which mat has its inner edge fitted to the edge of the back plate and its outer edge fitted to the side walls of the frame.

It will be seen that by this arrangement secure seats are provided for the mirror and the back plate irrespective of the shape of the side walls of the frame and also without the necessity of forming seats in the frame itself for the mirror and back plate. Furthermore, this arrangement prevents the breakage of the articles held within the frame, which breakage is very large where the mats are formed in the frame itself.

This invention also permits the frames to be made of various shapes and sizes and yet successfully hold mirrors and back plates therein having a certain prescribed shape, such as a circular form.

While I have shown this invention as applied to a mirror, it is obvious that it may be applied to other articles which require attachment to a frame.

What I claim is:

1. An article, a hollow frame therefor having irregular side walls spaced from the edge of the article and a mat having its inner edge fitted to the edge of the article and its outer edge fitted to the side walls of the frame.

2. A back plate, a hollow frame therefor having irregular side walls spaced from the edge of the back plate and a mat having its inner edge fitted to the edge of the back plate and its outer edge fitted to the side walls of the frame.

3. An article, a back plate, a hollow frame therefor having irregular side walls spaced from the edges of the article and back plate and mats having their inner edges fitted to the edges of the article and back plate and their outer edges fitted to the side walls of the frame.

4. An article, a hollow frame therefor having its inner edge overlapping the edge of the article and having irregular side walls spaced from the edge of the article and a mat having its inner edge fitted to the edge of the article and its outer edge fitted to the side walls of the frame.

5. A back plate, a hollow frame therefor having its inner edge overlapping the edge of the back plate and having irregular side walls spaced from the edge of the back plate and a mat having its inner edge fitted to the edge of the back plate and its outer edge fitted to the side walls of the frame.

6. An article, a back plate, a hollow frame therefor having its inner edges overlapping the edges of the article and the back plate and having irregular side walls spaced from the edges of the article and the back plate and mats having their inner edges fitted to the edges of the article and the back plate and their outer edges fitted to the side walls of the frame.

7. An article, a hollow frame therefor comprising front and back members, the front member having its inner edge overlapping the edge of the article, and a spacing mat secured to the front member having its inner edge fitted to the edge of the article and its outer edge fitted to the side walls of the frame.

In testimony, that I claim the foregoing as my invention, I have signed my name in presence of two witnesses, this twenty ninth day of August, 1907.

ROBERT R. DEBACHER.

Witnesses:
E. D. WHITMOR,
H. BEHRENS.